March 23, 1926. 1,578,100
J. E. SHOFF
ATTACHMENT FOR CORN PLANTERS
Filed Feb. 2, 1923 3 Sheets-Sheet 1
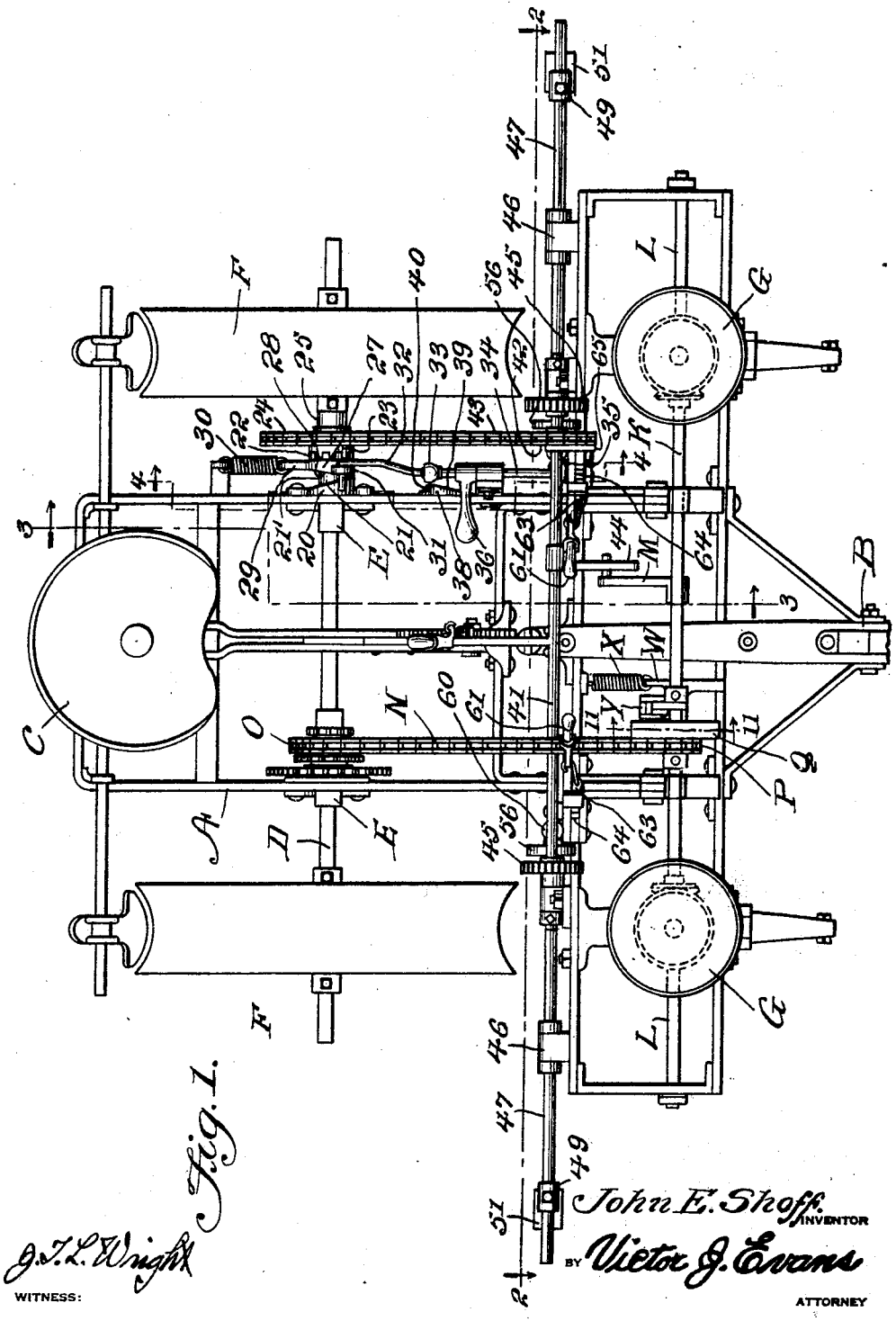

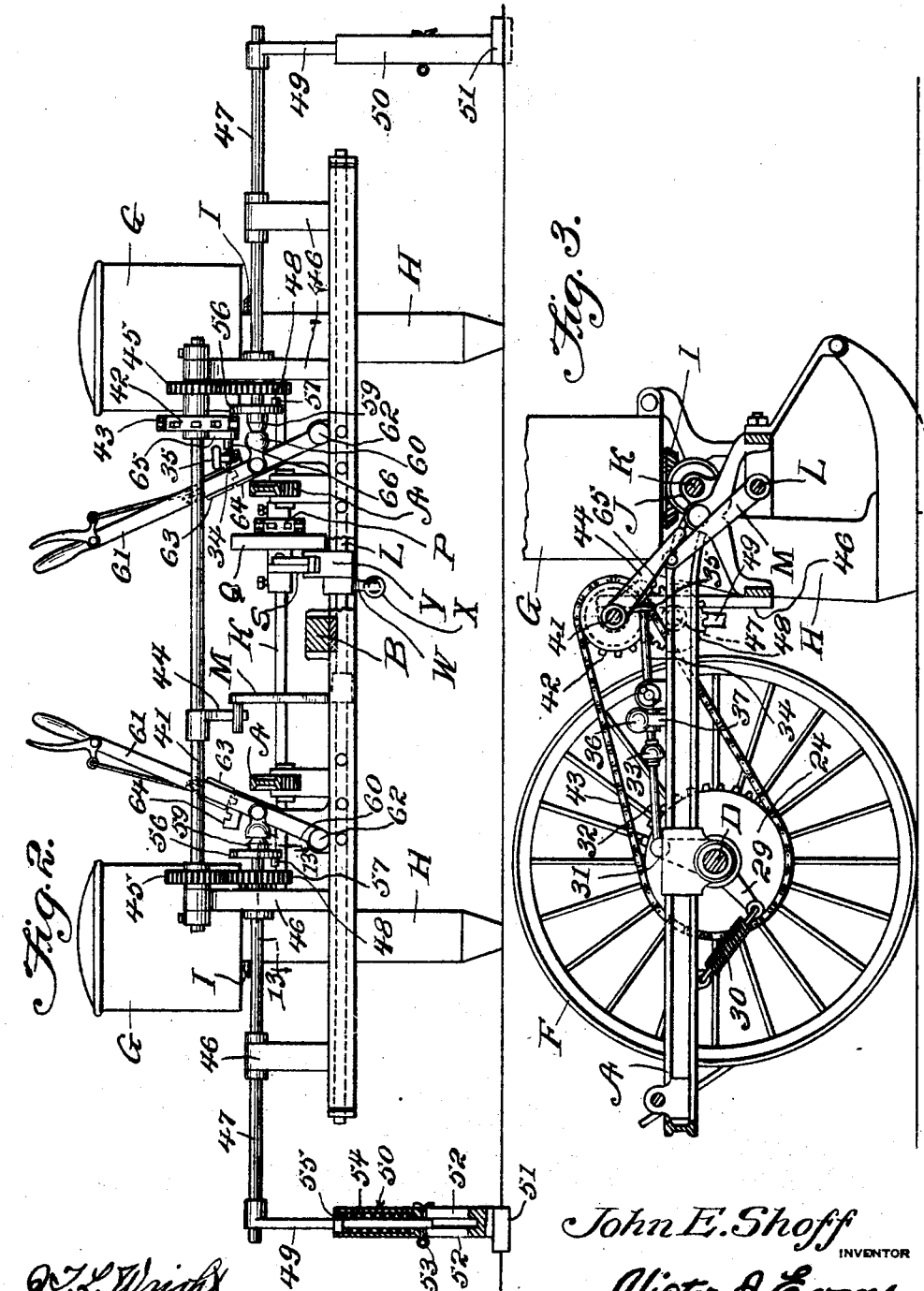

March 23, 1926.
J. E. SHOFF
ATTACHMENT FOR CORN PLANTERS
Filed Feb. 2, 1923
1,578,100
3 Sheets-Sheet 3
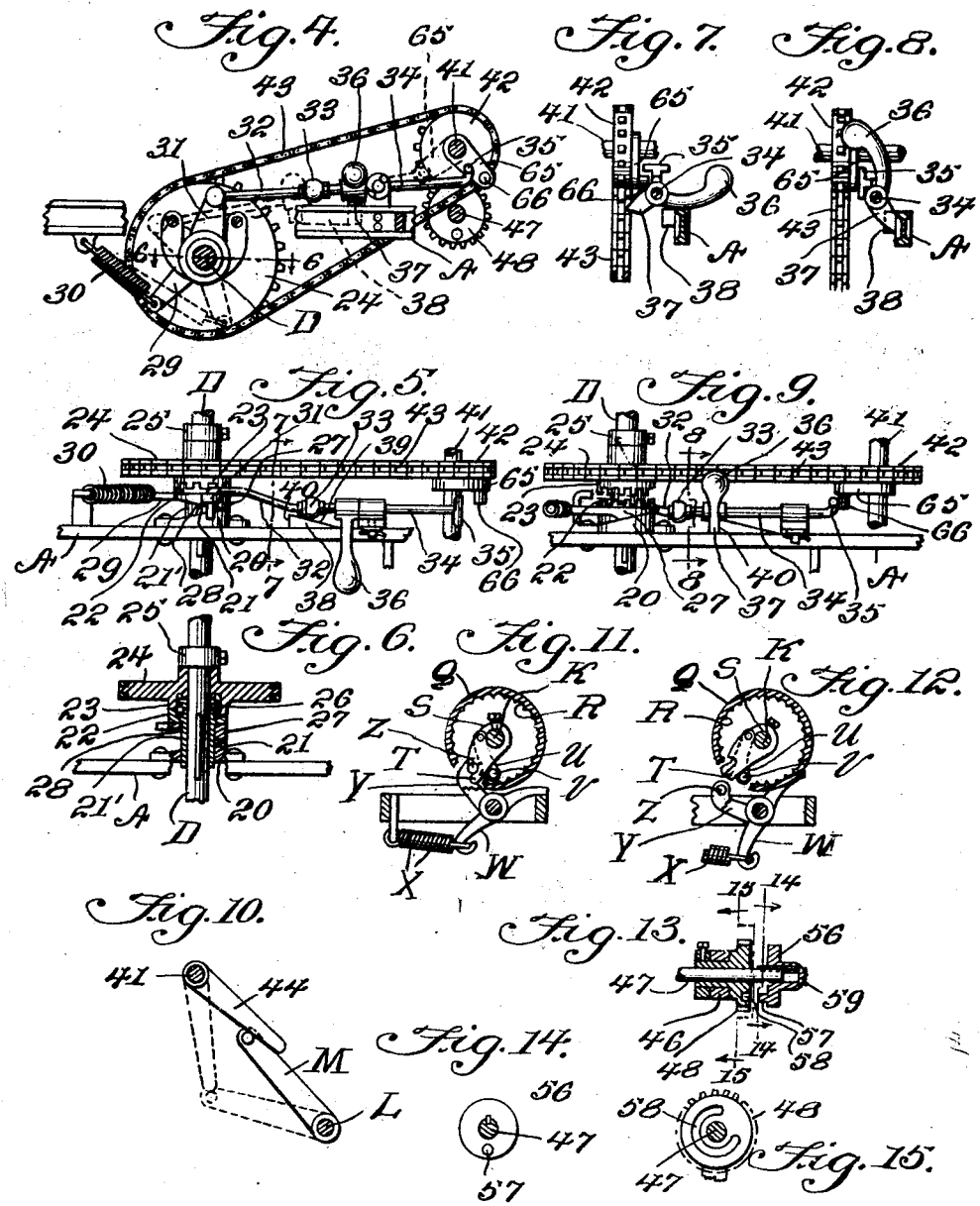

Patented Mar. 23, 1926.

1,578,100

UNITED STATES PATENT OFFICE.

JOHN E. SHOFF, OF MOORHEAD, IOWA.

ATTACHMENT FOR CORN PLANTERS.

Application filed February 2, 1923. Serial No. 616,546.

*To all whom it may concern:*

Be it known that I, JOHN E. SHOFF, a citizen of the United States, residing at Moorhead, in the county of Monona and State of Iowa, have invented new and useful Improvements in Attachments for Corn Planters, of which the following is a specification.

This invention relates to corn planters and has for its object the provision of automatically operated marking means therefor whereby to mark the ground as each hill is dropped and avoid all use of the well known check wire which is commonly used for effecting the tripping action.

An important object is the provision of a device of this character in which the construction and mounting of the marker is such that when going over a field the marker will operate to make a series of marks which will serve as a guide for the return trip, the machine being so positioned that one of the marks will be within the last mark made during the planting of the preceding row, when starting the return.

Another object is the provision of a device of this character in which the marking means is so constructed and mounted that it may be disconnected and made inoperative at will, as for instance when crossing a ditch or passing over a stone, stump or other obstruction which might cause serious damage to the mechanism.

Another object is the provision in a device of this character of an automatic release mechanism which will throw out the clutch which drives the marking mechanism and lock the markers when the last hill of corn is dropped leaving them in position to start on the last mark when going back over the field.

A further object is the provision of a peculiar and highly efficient clutch mechanism which is normally engaged for driving the markers and which is provided with means for effecting its locking in inoperative position when tripped by the clutch release.

Another object is the provision of a peculiar locking pawl controlled or operated drive for the rock shaft which trips the seed dropping mechanism.

An additional object is the provision of an attachment or structure of this character which will be comparatively simple to construct and install, easy to operate and control, positive in action, durable in service and a general improvement in the art.

With the above and other objects and advantages in view the invention consists in the details of construction to be hereinafter more fully described and claimed and illustrated in the accompanying drawings, in which:

Figure 1 is a plan view of a corn planter equipped with my mechanism,

Figure 2 is a front elevation thereof,

Figure 3 is a cross section on the line 3—3 of Figure 1,

Figure 4 is a detail section on the line 4—4 of Figure 1,

Figure 5 is a detail plan view of the clutch mechanism in operative position,

Figure 6 is a detail sectional view of this clutch mechanism, the view being taken longitudinally of the drive shaft, Figure 7 is a detail cross sectional view on the line 7—7 of Figure 5, Figure 8 is a similar view but showing the clutch as thrown into released position, this view being indicated by the line 8—8 on Figure 9, Figure 9 is a detail plan view of the clutch mechanism in released position, Figure 10 is a somewhat diagrammatic view illustrating the action of the trip arms controlling the dropping mechanism, Figure 11 is a detail cross sectional view on the line 11—11 of Figure 1, Figure 12 is a similar view showing the shaft locked for rotation with the drum, Figure 13 is a detail longitudinal section on substantially the line 13—13 of Figure 2, Figure 14 is a cross section on the line 14—14 of Figure 13, Figure 15 is a detail cross section on the line 15—15 of Figure 13.

Referring more particularly to the drawings I have shown my invention as applied to a corn planter of a more or less conventional and well known type in which is provided a supporting frame structure A carrying a draft device B and a seat C and mounted upon an axle D which is rotatable in suitable bearings E and which is provided with ground engaging wheels F. Mounted at the forward portion of the frame are seed hoppers G having associated therewith dropping shoes H. The hoppers are provided with the usual feed mechanism, not shown, operated by bevel gears I driven by other bevel gears J on a shaft K which is journaled across the front of the machine. The trip mechanism for permitting the seed to pass from this feed mechanism to the dropping shoes is not shown but is of the conventional variety operated by a rock shaft L extending across the front of the machine below the shaft K and carrying an arm M which is ordinarily tripped by a check wire.

The shaft K is intermittently rotated by a peculiar drive mechanism which includes a chain N trained about a sprocket O on the axle D and also trained about a sprocket P carried by a drum Q loose on the shaft K. This drum is internally toothed as shown at R. Keyed or otherwise secured on the shaft K within the drum Q is an arm S having a finger T which projects beyond the periphery of the drum. Pivoted upon this arm S is a pawl U which is gravity operated and which carries a pin V designed to lock into the teeth R at certain times for providing a drive connection between the drum Q and shaft K for rotating the shaft K one revolution at certain periodic intervals. Secured on the shaft L is a hub member carrying an arm W engaged by a spring X secured to the frame, and also extending from this hub is an arm Y carrying a pin Z and movable to bring the pin Z in the path of travel of the finger T.

When the arm M is tripped by the means to be hereinafter described which form an important part of my invention, the arm Y is swung against the resistance of the spring V and the pin moves into the path of travel of the finger T. When this occurs the pawl U is moved out of is normal straight depending position so that the pin V thereon engages the teeth R in the constantly rotating drum Q and this provides a positive lock or drive between the drum and the arm S and consequently the shaft K so that the shaft will be rotated until it has made one complete revolution whereupon the pawl U will gravitationally drop out of engagement with the teeth R and again release the drive connection to the shaft K. In this way the feed mechanism in the hoppers is operated at intervals to correspond with the rocking movement of the shaft L which operates the dropping mechanism. All the above described matter is old and well known but is explained as being more or less necessary to a proper understanding of the present invention.

In carrying out my invention I provide on the frame A at the side opposite that where the sprocket O is located, a stationary cam member 20 having an inclined suface 21, and the axle passes through this cam member. Splined upon the axle and slidable and rotatable through the same member 20 is a sleeve 21' having a clutch face 22 co-operating with a corresponding clutch face 23 on the hub of a sprocket 24 which is loose upon the axle but which is restrained from longitudinal movement by a collar 25. The clutch end of the sleeve 21' and the adjacent face of the hub of the sprocket are recessed to accommodate a coil spring 26 which tends to separate the clutch faces. Rotatable upon the sleeve is a collar 27 having an inclined surface 28 co-operating with the inclined surface 21 for exerting a cam or wedging action for throwing the clutch faces into and out of engagement as will be described. The collar 27 carries an arm 29 with which is connected one end of a coil spring 30 which has its other end secured to the frame and the purpose of this spring is to urge the collar into such rotated position that the cam surface 28 thereof will engage the cam surface 21 in such manner that the clutch faces 22 and 23 will be in engagement for causing rotation of the sprocket 24 with the axle. The collar 27 also carries an upstanding arm 31 with which is pivotally connected a forwardly extending rod 32 with which is connected by a universal joint 33 an extension rod 34 terminating in a T-shaped head 35. Secured upon the rod 34 is a pedal 36 located within convenient reach of the operator's foot while he is seated upon the seat C. The hub of this pedal carries a projection 37 which co-operates with a keeper 38 on the frame, this keeper having an inclined surface 39 which constitutes a cam which will permit the extension 37 to ride over it and catch behind the shoulder 40 of the keeper, at certain times, for holding the clutch members 22 and 23 locked out of engagement.

Journaled transversely of the forward portion of the machine is a shaft 41 mounted in suitable bearings and carrying near one end a sprocket 42 about which is trained a chain 43 which is, in turn, trained about the sprocket 24 so as to be driven by the axle of the machine when the clutch members 22 and 23 are in engagement. Carried by the shaft 41 is an arm 44 which co-acts with the arm M for rocking the shaft L in place of having the arm M rocked by any conventional check wire. At its ends the shaft 41 carries spur gears 45.

Disposed in alignment and journaled across the front portion of the machine in suitable bearings 46, are shafts 47 which pass slidably and rotatably through spur gears 48 which mesh with the gears 45. At the outer end of each shaft 47 is a marker which consists of an arm 49 extending into a sleeve 50 carrying a marking foot 51 adapted to penetratingly engage the ground. The opposite sides of the sleeve 50 are formed with slots 52 for the accommodation of a transverse cotter or other pin 53 which passes through the rod 49. Within the sleeve 50 is a coil spring 54 seating within a socket and bearing against a collar 55 on the arm or rod 49. When the shafts 47 rotate, the marking members are of course turned over with them and will engage the ground for making marks therein. The spring structure within the marking member permits a yielding or cushioning effect so that no injury will result in case the marker strikes a stone, hard lump of clay or other object which is not of excessive size.

It is of course not desired that the markers rotate always and for this reason I provide a clutch mechanism which will control the rotation of the shafts 47. This clutch mechanism consists of disks 56 slidably and non-rotatably mounted on the inner ends of the shafts 47, each disk carrying a pin 57 adapted to engage within a nearly circular groove 58 in the confronting face of the gear 48. These disks 56 carry stems 59 which have ball and socket connections 60 with control levers 61 pivoted at 62 and carrying grip released latches 63 co-operating with notched segments 64 suitably mounted on the frame. The levers 61 are individually operable and by swinging a lever outwardly the disk 56 connected therewith by the ball and socket joint will be brought against the face of the adjacent gear 48 with the pin 57 entering the groove 58 and providing a drive connection which will cause the associated shaft 47 to be rotated for operating the marker. The reason for having the groove 58 of the circular form is to insure proper timing of the operation of the parts so that the marker will engage the ground at the exact time that a charge of seed is dropped. The advantage of throwing either of the marking devices out of operation is that it permits the operator to render them inoperative in case there is danger of striking a large stone or stump which might cause injury and this feature is also advantageous when crossing ditches and the like.

The automatic clutch release means consists of an arm 65 carried by the shaft 41 and having its free end provided with a pin 66 into the path of movement of which the head 35 is brought when the operator kicks the pedal 36 from the position shown in Figure 7 into the position shown in Figure 8. When the pedal is thus moved the head 35 is turned partly over and will be in such position that the pin 66 will engage it and force it and consequently the rods 34 and 32 rearwardly and turn the collar 27 against the resistance of the spring 30, which will result in bringing the highest part of the cam surface 28 into engagement with the lowest point of the cam surface 21. This permits the spring 26 to force the clutch members 22 and 23 apart and the rotation of the sprocket 24 and all the parts driven thereby consequently ceases. When the rearward movement of the rods 32 and 34 occurs the projection 37 automatically locks behind the shoulder 40. This automatic clutch release is effected at the precise moment that the last hill is planted, the markers being in their marking position. The machine is thus inactive and should then be turned about so as to start back over the field in the opposite direction, one of the marker arms being brought into registration with the last mark made during the planting of the preceding row, after which the operator kicks the pedal 36 back into the position shown in Figures 5 and 7 to release the projection 37 from behind the shoulder 40, which will permit the spring 30 to reengage the clutch. As the machine is then drawn along the mechanism is then all driven and another double row of hills will be planted in exact alignment with all the previous rows so that a uniform effect will be produced which will insure easy cultivation of a growing crop at a subsequent time.

From the foregoing description and a study of the drawings it will be apparent that I have thus provided a simple attachment to a corn planter which entirely obviates the use of a check wire and which provides highly efficient and accurate means for marking the ground automatically as the successive hills are planted so that no difficulty whatever will be experienced in properly starting the successive rows. It of course to be noted that the clutch release is automatically effected by the tractive power of the device at the exact proper moment that the last hill has been dropped, the clutch mechanism furthermore automatically locking to prevent operation of the parts until the machine has been brought to the proper position for starting planting of the next row. Adequate means is also provided for throwing either or both markers temporarily out of gear for the purpose of avoiding striking some obstruction or the like which might cause injury to the mechanism. In actual practice the device has proved in every way to be a distinct success in efficiency of operation and ease of control.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a corn planter including a rotary axle carrying wheels supporting a frame and further including seed hoppers and dropping shoes equipped with feeding and dropping mechanism; marking means consisting of a counter-shaft driven from the rotary axle of the machine, a pair of outwardly extending shafts carrying marking members engageable with the ground, and a drive connection between said counter-shaft and said last named shafts, consisting of gears on the ends of the counter-shaft, other gears meshing therewith and through which the last named shafts are slidable and rotatable, and clutch means for locking either of said last named shafts for rotation with the associated last named gear.

In testimony whereof I affix my signature.

JOHN E. SHOFF.